United States Patent [19]
Takeda et al.

[11] Patent Number: 5,047,868
[45] Date of Patent: Sep. 10, 1991

[54] IMAGE DATA PROCESSING METHOD FOR SELECTIVE PARTIAL IMAGE DISPLAY

[75] Inventors: Haruo Takeda, Kawasaki; Kuniaki Tabata, Tokyo, both of Japan

[73] Assignee: Hitachi, Ltd., Tokyo, Japan

[21] Appl. No.: 95,752

[22] Filed: Sep. 11, 1987

[30] Foreign Application Priority Data

Sep. 12, 1986 [JP] Japan ................................. 61-213885
Feb. 4, 1987 [JP] Japan ................................. 62-22307

[51] Int. Cl.$^5$ .............................................. H04N 5/76
[52] U.S. Cl. .................................... 358/335; 340/731
[58] Field of Search ................ 358/22, 183, 335, 342, 358/287, 102, 160, 903, 133, 138, 137; 360/33.1, 35.1; 364/452, 521; 382/47

[56] References Cited

U.S. PATENT DOCUMENTS

| | | | |
|---|---|---|---|
| 3,983,328 | 9/1976 | Newell | 178/6.8 |
| 4,172,264 | 10/1979 | Taylor et al. | 358/185 |
| 4,229,808 | 10/1980 | Hui | 360/48 X |
| 4,249,211 | 2/1981 | Baba et al. | 358/180 X |
| 4,319,267 | 3/1982 | Mitsuya et al. | 358/13 |
| 4,360,876 | 11/1982 | Girault et al. | 364/449 |
| 4,490,747 | 12/1984 | Yokoyama | 369/32 X |
| 4,535,439 | 8/1985 | Satoh et al. | 369/32 X |
| 4,545,044 | 10/1985 | Satoh et al. | 369/32 |
| 4,573,084 | 2/1986 | Iida | 369/32 X |
| 4,614,977 | 9/1986 | Kawahura et al. | 358/909 X |
| 4,641,197 | 2/1987 | Miyagi et al. | 358/903 X |
| 4,660,096 | 4/1987 | Arlan et al. | 358/335 X |
| 4,672,444 | 6/1987 | Bergen et al. | 358/140 |
| 4,682,869 | 7/1987 | Itoh et al. | 358/426 |
| 4,686,580 | 8/1987 | Kato et al. | 358/77 X |
| 4,716,404 | 12/1987 | Tabata et al. | 364/521 X |
| 4,734,785 | 3/1988 | Takei et al. | 358/77 X |
| 4,739,350 | 4/1988 | Arao | 358/300 X |
| 4,746,981 | 5/1988 | Nadan et al. | 358/183 X |
| 4,748,511 | 5/1988 | Nichols et al. | 382/56 |
| 4,752,836 | 6/1988 | Blanton et al. | 358/342 |
| 4,763,208 | 8/1988 | Kawamura et al. | 360/33.1 |
| 4,774,562 | 9/1988 | Chen et al. | 358/133 |
| 4,782,397 | 11/1988 | Kimoto | 358/102 X |
| 4,790,025 | 12/1988 | Inoue et al. | 382/47 |
| 4,791,680 | 12/1988 | Tokoe et al. | 382/47 X |
| 4,802,019 | 1/1989 | Harada et al. | 358/335 |

OTHER PUBLICATIONS

NITFILE—60; Hitachi Optical Disk File System; 12 pages.

Primary Examiner—Donald McElheny, Jr.
Attorney, Agent, or Firm—Fay, Sharpe, Beall, Fagan, Minnich & McKee

[57] ABSTRACT

A retrieved image display method in an image file system in which image data records undergone a data compression and index records including positional information of the image data records are stored in a file medium. The method includes a first step to specify a partial region of a retrieved image to be displayed on a display screen, a second step to attain, based on positional information above included in an index record corresponding to the retrieved image, a recording position of an image date portion on the file medium corresponding to the partial region to be displayed and to partially read out image data from the image data record, and a third step to restore the compressed image data thus read out into the original image data and to display the restored image data on the display screen. In accordance with to the partial region specified in the first step, the operations of the second step and the third step are successively and repetitiously achieved for a plurality of retrieved images to thereby flip pages of the retrieved images on the display screen.

14 Claims, 14 Drawing Sheets

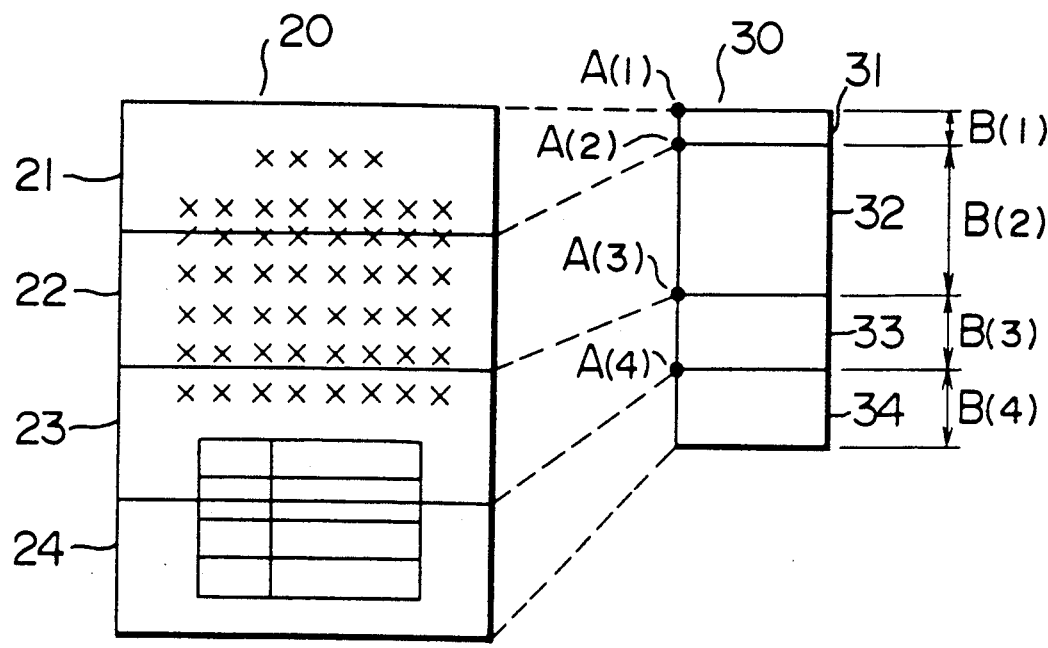

FIG. 8
| | | | 80 | | | | |
|---|---|---|---|---|---|---|---|
| 1 | TOKKYO | $A'_1(1)$ | $a_1(1)$ | $B_1(1)$ | $A'_1(2)$ | | $B_1(4)$ |
| 2 | TOKKYO | $A'_2(1)$ | $a_2(1)$ | $B_2(1)$ | $A'_2(2)$ | | $B_2(4)$ |
| ⋮ | | | | | | | |
| j | TOKKYO | $A'_j(1)$ | $a_j(1)$ | $B_j(1)$ | $A'_j(2)$ | | $B_j(4)$ |
| ⋮ | | | | | | | |
| ℓ | TOKKYO | $A'_\ell(1)$ | $a_\ell(1)$ | $B_\ell(1)$ | $A'_\ell(2)$ | | $B_\ell(4)$ |
| | 81 | 82-1 | 83-1 | 84-1 | 82-2 | | 84-4 |
FIG. 15
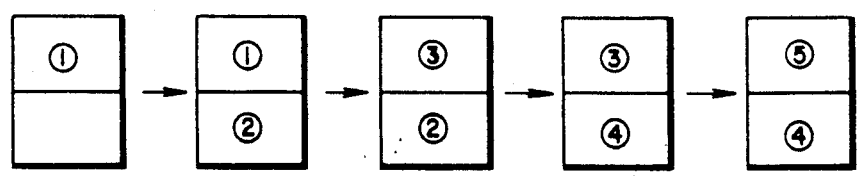
FIG. 16
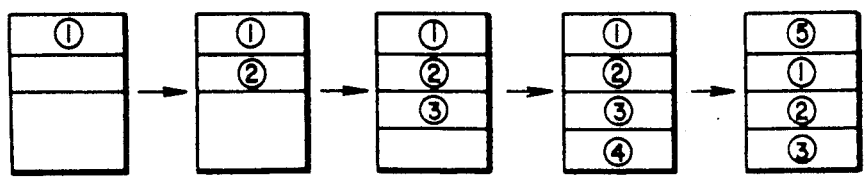

IMAGE DATA PROCESSING METHOD FOR SELECTIVE PARTIAL IMAGE DISPLAY

CROSS-REFERENCES TO THE RELATED APPLICATIONS

This application relates to a U.S. application Ser. No. 067,014, filed June 29, 1987 now abandoned by Haruo TAKEDA and Kuniaki TABATA, entitled "IMAGE DATA DISPLAY SYSTEM" and assigned to the present assignee, based on Japanese Patent Application No. 61-149510 filed June 27, 1986.

BACKGROUND OF THE INVENTION

1. Field of the Invention

The present invention relates to an image file system, and in particular, to a method for storing and displaying image data suitable for displaying at a high speed a retrieved image in an image file system.

2. Description of the Related Art

Recently, a document image file system (electronic file) using a large-capacity optical disk has become noticeable as a new means for document management. An optical disk has a large data storage capacity to record a great amount of data including the image data and therefore can be used as a store means storing document image information such as an account sheet, a design drawing, a contract, and the like. When retrieving these document images, it is desirable in ordinary cases to use an index such as a predetermined document name, classification name, keyword, or the like. When the index becomes to be complicated, however, it takes time to effect a job storing the document images together with the complex indices; furthermore, such a complicated index often becomes difficult to remember when a document is to be retrieved. To overcome this difficulty, only a simple index such as a classification name is often added to the document image for the storage in practice. Moreover, a stored image having a complex index added thereto is commonly retrieved by specifying only a simple index. In this case, to retrieve an objective document image, the operator must sequentially display on a display screen a plurality of candidate data retrieved by specifying an index such as a classification name so as to visually confirm the display contents, thereby extracting the objective document.

As a method for selecting the document image above, there has been a method, for example, described in pages 6-7 of the "Operation manual for Hitachi Optical Disk File System" (manual number 60-10-001-20) in which a previous page key or a next page key is used. According to this method, a sheet of image data is displayed on the screen each time the key is pressed. This method may be improved, for example, such that when a page change key is pressed, an automatic page change is effected for the retrieval data so as to sequentially display the data on the display screen until the next key depression is recognized as a termination command.

As described above, in the case where the document images obtained by the index retrieval (primary retrieval) are sequentially displayed so as to visually extract an object document therefrom (secondary retrieval), it is desired to increase the speed of the page change in a range in which the operator can judge whether the display document is an objective document or not, thereby minimizing a period of time required for the secondary retrieval. In the conventional retrieval system, however, the processing is achieved in a form that the document data attained by the primary retrieval is read from the document image file in a page-by-page (i.e. record-by-record) fashion so as to sequentially display the record data and the read speed of each image data is restricted by the performance of the file device; consequently, the cycle of the update of display content cannot be less than the time required to read data for a document, which leads to a problem that a wait time takes place to obtain the next screen.

SUMMARY OF THE INVENTION

It is therefore an object of the present invention to provide a method and system for displaying a retrieved image which can sequentially display a plurality of retrieved images at a high speed.

Another object of the present invention is to provide a method for storing or registering compressed image data suitable for a high-speed display of a retrieved image.

In a document retrieval in which document images attained by the index retrieval are sequentially displayed to enable the operator to visually retrieve an objective document, the entire image of each document need not be necessarily displayed, for example, only a portion of the document such as a title, a name of an author, or a synopsis may suffice the retrieval object in many cases. For example, in the case where the operator bears in mind a location of description identifying an objective document, the necessity/ unnecessity of the displayed document is judged by the operator depending on the location; consequently, the function to display the primary retrieval data need only display a particular partial region specified by the operator.

To achieve these objects, according to the method for displaying the retrieved image according to the present invention, there are included in an image file system storing on a file medium a plurality of image data records each including compressed data and at least one index record including positional information of the image data record, a first step of specifying by the operator a partial region of a retrieved image to be displayed on a display screen, a second step of selectively reading, based on the positional information contained in the index record corresponding to the retrieved image, a particular image data region corresponding to the partial region to be described from each retrieval image data record on the file medium, and a third step of restoring the compressed image data thus read to display the restored image data on the display screen. When there exist a plurality of retrieved images to be displayed, the operations of the second step and the third step are repeatedly accomplished depending on a result of the designation of the partial region in the first step.

In a file system of image data, since a plurality of images are stored on a file medium for an effective use of a memory area, original images are encoded to obtain compressed data for storage in a common practice. In this case, a density of information in a record on the file medium undergone the data compression is different from a density of information in the original image. As a consequence, for example, even if information equivalent to half a record is read from the record, the obtained information data does not necessarily restore the complete portion equivalent to half the page of the original image. According to the present invention, based on positional information contained in an index record, a recording position of an image data on the file medium corresponding to a position in an original image specified by the user for a display or to a partial area of a reproduced image is obtained so as to selectively read out only a data portion at a position corresponding to the partial region from each image record on the file medium, which minimizes the quantity of image data to be read and hence reduces the image display cycle. In the first embodiment according to the present invention, for example, to correspond the partial region in the original image specified by the user to a position of the particular region of the compressed image data to be read from the file medium, the original image is subdivided into a plurality of subregions in advance and the recording position of the compressed data associated with each subregion is stored in an index record when the image data is registered to a file. For a display position, the user specifies at least one subregion of the subdivided original image. Furthermore, in the case where the original image is directly registered, namely, without subdividing the original image, when a display subregion is specified by the user, based on the positional information contained in the index record, each compressed image record is subdivided into a plurality of partial data areas or the like; moreover, assuming that there exists a proportional relationship between the data distribution in the compressed image record and that in the reproduced image, a partial data region corresponding to the display subregion specified by the user is extracted. Since the reproduced (restored) image of the partial data area thus attained may possibly be shifted from the subregion requested by the user, in the embodiment of the present invention, a read region for the image data read operation is set to be greater than the partial data region obtained by the subdivision of the image.

According to another embodiment of the present invention, a subregion to be displayed is identified by a specification of a time interval desired by the operator to change over between the respective images on the display screen. That is, when the operator specifies a time interval, a volume of compressed image data which can be displayed in the interval of time is read from each retrieved image data. In this case, if a data is to be read beginning from each image record, the quantity of the read data increases as the specified time interval becomes longer, namely, the document image display is effected with an increasing number of character lines displayed.

The foregoing and other objects, advantages, manner of operation and novel features of the present invention will be understood from the following detailed description when read in connection with the accompanying drawings.

BRIEF DESCRIPTION OF THE DRAWINGS

FIG. 3 is a schematic diagram useful for explaining the correspondences between a partial region in original image data 20 and a partial region in a record to be stored in the file;

FIG. 4 is a schematic diagram illustrating an embodiment of the record format of an index file;

FIG. 8 is an explanatory diagram of an index table including index records of image data to be displayed;

FIGS. 15-16 are schematic diagrams respectively showing other embodiments of data display format according to the present invention.

DESCRIPTION OF THE PREFERRED EMBODIMENTS

Figure 1:
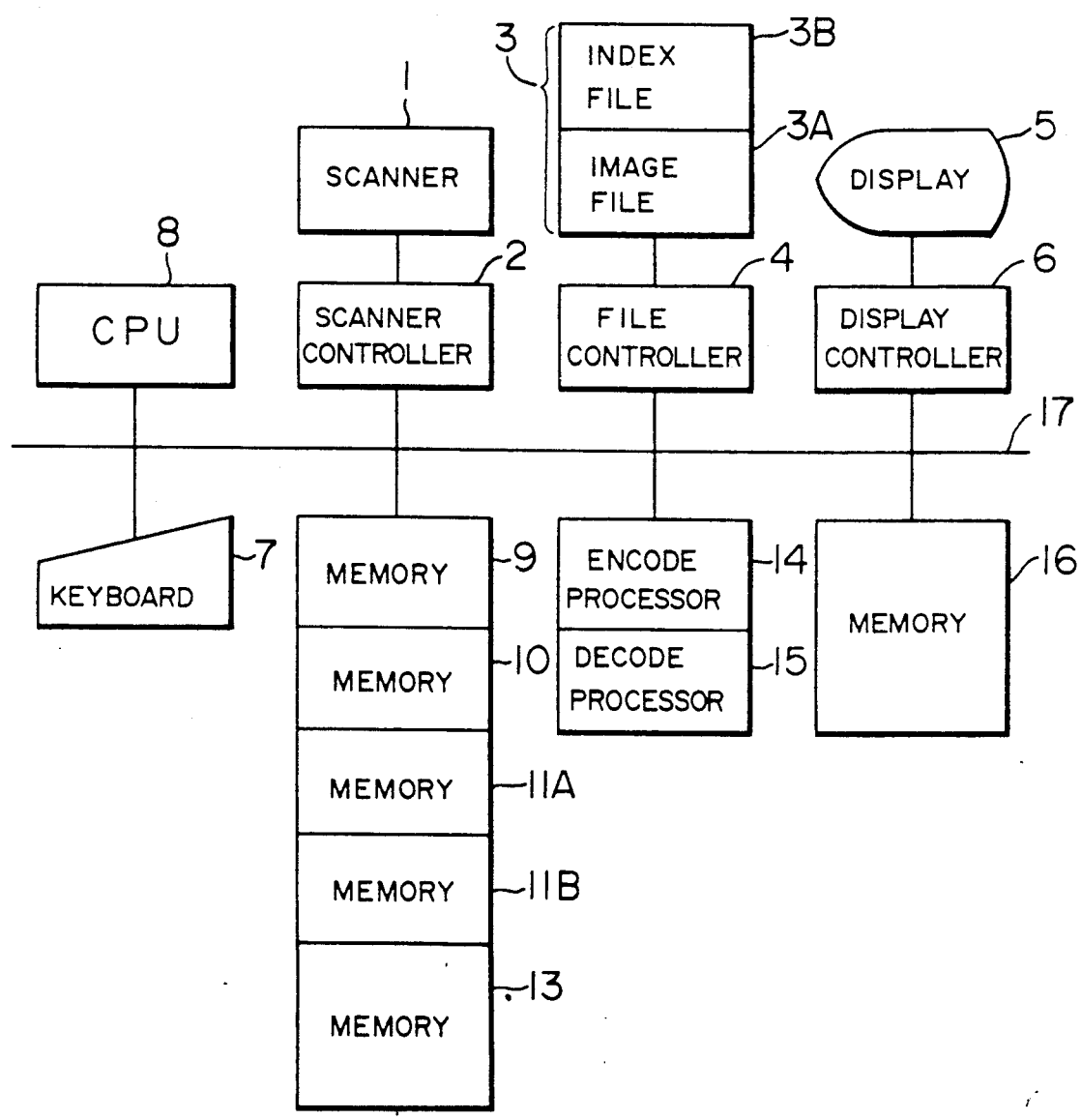
FIG. 1 is a schematic block diagram illustrating the overall configuration of an image file system.

FIG. 1 is an overall configuration diagram of an image file system according to the present invention including a scanner 1 for inputting image data, a controller 2 of the scanner 1, an image file 3A for storing the registered data in the form of compressed, encoded data, an index file 3B for storing index data prepared to retrieve the corresponding image data, a controller 4 for effecting a data read operation and a data write operation on the image file 3A and the index file 3B, a display 5 for displaying image data and character data such as a command, a controller 6 for controlling the display 5, a keyboard 7 for inputting character data such as a command and index data, a processor (CPU) 8 for controlling the entire system, a memory 9 for storing programs to be executed by the CPU 8, a work memory 10 for storing various variables or tables to be used by the CPU 8, buffer memories 11A-11B for temporarily storing an encoded image read from the image file 3A, an image memory 13 for storing original image data inputted from the scanner 1, a processor 14 dedicated to encode or compress original image data, a processor 15 dedicated to decode or expand the encoded image data, a bit map memory 16 corresponding to the display contents of a displayed image, and a bus 17.

In this configuration, the memories 9-13 and 16 need not be physically separated devices and may be allocated as the different store area in the same memory device. Furthermore, as will be described later, some of these memory areas may be commonly used for the purposes to reduce the total memory. Although the image file 3A and the index file 3B may be cofigured by means of separate file media, since the image file 3A and the index file 3B are to be constructed in pair in this configuration, different regions of the optical disk 3 are allocated as the image file 3A and the index file 3B, respectively. Consequently, the file controller 4 is shared among the image file 3A and the index file 3B.

Incidentally, the file controller 4 is assumed to include a driving device of the optical disk 3. Furthermore, although the encode processor 14 and the decode processor 15 are different from each other in a sense of the circuit, the encode processor 14 and the decode processor 15 are often integrated in the same LSI chip and hence are located to be adjacent to each other in this schematic diagram. Various encoding algorithms have been known for the image data to be encoded by the encode processor 14, for example, a run-length encode method described in a literature entitled "Image Signal Processing for FAX and OA" by Takehiko FUKINUKE published by Nikkan Kogyo Newspaper (1982), pp. 61–75. However, the gist of the present invention is not changed by the encode algorithm, namely, any other algorithm may be used.

Figure 2:
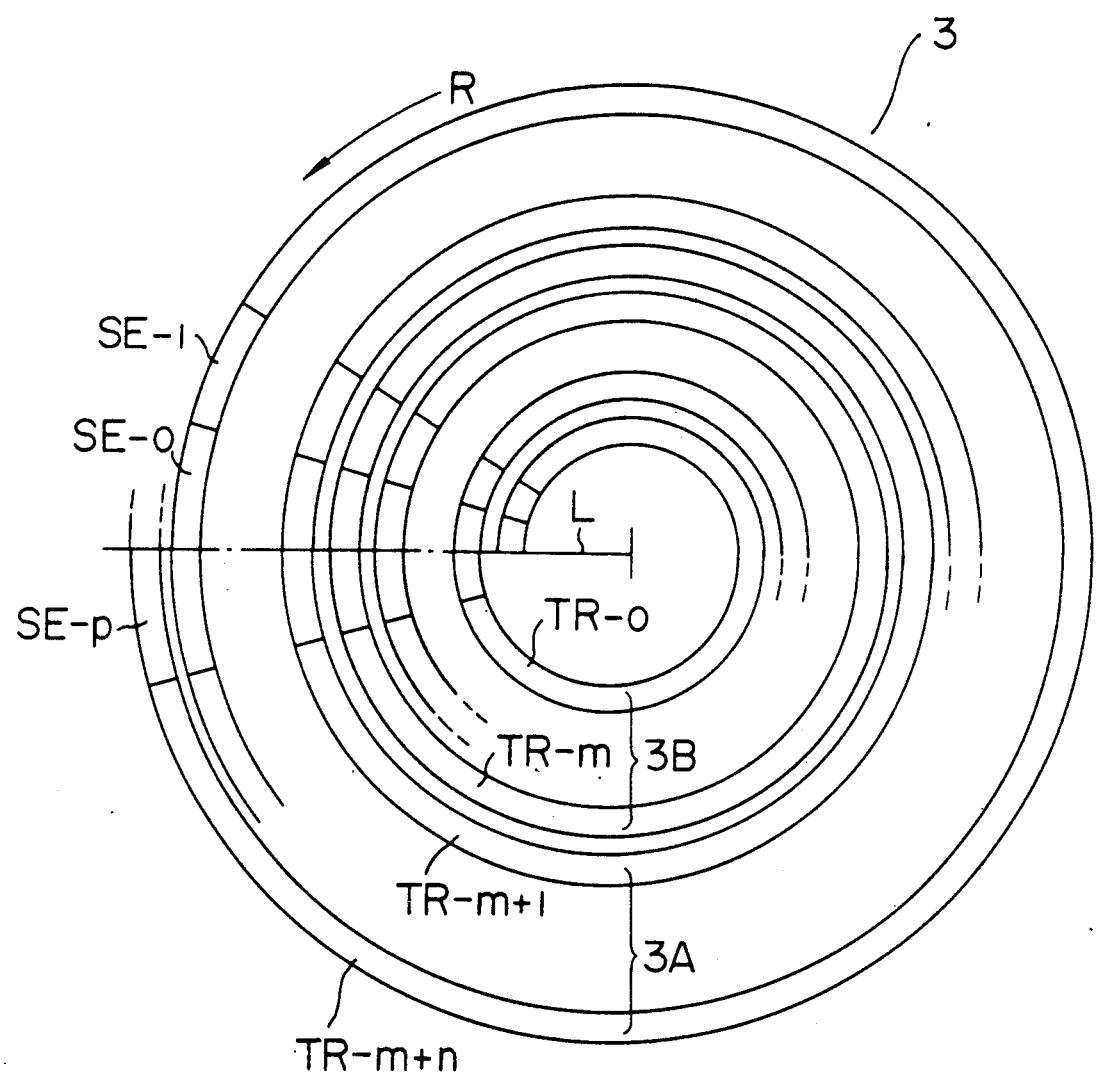
FIG. 2 is a schematic diagram showing an example of a recording medium constituting the image file.

FIG. 2 is a schematic diagram showing the image file region 3A and the index file region 3B on the optical disk 3. There is formed on the optical disk 3 a spiral track TR continuing from a center side to an outer side of the disk 3. The track TR is subdivided into a plurality of tracks TR-0 to TR-m+n with reference to the reference line L in which the track numbers are assigned as 0 to m+n beginning from the pertinent inner track. Furthermore, each track is subdivided into a plurality of sectors SE-0 to SE-p each being the minimum unit of the data block for the read and write operations. The respective sectors are designated with sector numbers 0-p in the passing order of a read/write head thereover when the optical disk 3 rotates in a direction R. According to the present embodiment, a region from sector 0 of track 0 (TR-0) to the last sector of track m (TR-m) is allocated as the index file region 3B for storing indices including code data, whereas a region from sector 0 of track m+1 (TR-m+1) to the last sector of track M=N (TR-m+n) is used as the image file region B to store document image data. Although the address of each sector can be uniquely determined by use of a track number and a sector number, in this embodiment, the sector numbers are sequentially assigned beginning from sector 0 of the track 0, for example, sector j of track i is defined as $[i \cdot (p+1)+j]$-th sector.

FIG. 3 shows corresponding relationships between original image data 20 stored in the image memory 13 and image data (records) 30 which are compressed through the encoding operation so as to be stored in the buffer memory 11A. In this example, since P=4, the original image data 20 is subdivided into four square classification areas 21-24 of the same size. Since the respective subregions 21-24 in the original image include different amounts of information, respectively, if the image data is encoded for each subregion, the subregions 31-34 in the encoded image data 30 become to be of different sizes, respectively according to the data amounts thereof. In FIG. 3, B(i) indicates the data size of an i-th partial region of the encoded image. Although the data size can be conveniently represented by use of the number of bytes and the number of bits of a terminal byte, the total bit count is used in this embodiment for convenience of explanation. In addition, A(i) over the encoded image 30 indicates the head address of the i-th subregion. Although, in practice, this address can be conveniently expressed by use of a sector number in the image file region 3A above, a byte position, and a terminal bit position in the sector; a sector number A'(i) and a bit position a(i) in the sector are employed for convenience of the subsequent description of this embodiment.

In this embodiment, as described above, the original image data 20 is subdivided into a plurality of partial regions and each partial region is encoded so as to specify a partial region 2i in the original image. In this situation, in order to identify the partial region 3i of the encoded image corresponding to the partial region 2i, a boundary position of each encoded partial region 3i comprising the head address A(i) and the data size B(i) in this example is before-hand stored in the index file 3B. An index record 40 to be recorded in the index file 3B is here configured, for example, as shown in FIG. 4, which comprises an index field 41, fields 42-i and 43-i for storing the sector number A'(i) and the bit position a(i) in the sector indicating a location where the i-th partial region is stored in the image file 3B, and a field 44i for recording the length B(i) of the encoded data of the i-th region. The head address of the i-th partial region in the image file 3B is identified by use of A'(i) and a(i).

With the index file constituted in this form, in the case where image data attained by the index retrieval are sequentially outputted to the display 5, when the operator effects, for example, a display specification for only the upper-half of each image data, only the encoded image regions 31-32 respectively associated with the partial regions 21-22 corresponding to the upper-half of the original image can be selectively read out from the image file 3A. Since the selective data read operation enables to minimize the period of time required to achieve a read operation of each image data from the image file 3A, the update cycle of the display contents on the display 5 can be considerably reduced.

Referring next to the flowcharts of FIGS. 5A-5D, description will be given of the generation of the image file 3A and the index file 3B and the control operation of the image filing system to display the retrieved image data at a high speed by use of the image file 3A and the index file 3B. A program associated with the flowcharts is stored in the memory 9 so as to be executed by the CPU 8. In step 102, the optical disk 3 is first installed in the file controller 4. In step 104, the optical disk 3 is then searched to attain an address (an index file pointer $P_b$) on the optical disk at which the next index record is stored and an address (an image file pointer $P_a$) on the optical disk at which the next image data is stored. The obtained index file pointer $P_b$ and image file pointer $P_a$ are stored in the work memory 10.

In step 106, an input command entered by the operator is judged. If the input command is a register command, step 108 is executed to write the input image data from the scanner 1 in the image memory. In the next step 110, the image data is transferred to the bit map memory 16 so as to be displayed on the display screen. Judging the quality of the image displayed on the display 5 such as an inclination, a position, and a gradation thereof, the operator inputs the result of the judgment (step 112). If the input image is not attended by any problem, step 114 is effected to input from the keyboard 7 such index data as a document name and a classification name to be used as a retrieval key of the image data above. The index data items are stored in the work memory 10. In this embodiment, it is assumed to input only character strings indicating classification names of the document such as "TOKKYO (patent)", "RONBUN (thesis)", and "HOKOKUSYO (report)". Subsequently, in step 116, the divisor P used to subdivide the original image as described above is indicated through a command input from the keyboard 7. The divisor P may also be prescribed to be treated as a value beforehand fixed on the system side. In such a case, the input operation in the step 116 can be dispensed with.

In steps 118-126, the original image data 20 stored in the image memory 13 is divided by the divisor P to attain a plurality of partial regions, encoded image data is stored in the buffer memory 11A, and an index record described in conjunction with FIG. 4 is generated in the work memory 10. In this sequence, first of all, the value of a division area indication parameter i is initialized to one (i=1) in the step 118 and then the value of the image file pointer $P_a$ attained in the step 104 is set to A(i). At this point, the pointer $P_a$ indicates the first bit position of the identified sector and a(1)=1. In step 120, the i-th partial region 2i of the original image is subjected to the encode processing, which is executed by the encode processor 14 and then the encoded image data region 3i is written in the buffer memory 11A beginning from a position immediately following the (i−1)-th partial region (the first partial region 31 is written in the buffer memory 11A beginning from the top thereof). In step 122, the size B(i) and the address A(i) of the partial region 3i of the encoded image are added to an index record in the work memory 10. In step 124, the store address A(i+1) of the next (i+1)-th partial region 3i+1 is calculated from $$A(i+1) = A(i) + B(i).$$

When A(i+1) is represented by a sector address A'(i+1) and a bit position a(i+1), the address can be obtained from $$A'(i+1) = A'(i) + \left[ \frac{a(i) + B(i)}{K} \right]$$

$$a(i+1) = (A(i) + B(i)) \bmod K$$

where, the symbol [] indicates a Gaussian symbol meaning that an integer is obtained by truncating the content thereof, K is the number of bits per sector, and "mod" denotes a remainder of the division.

In step 126, the value of the parameter i is incremented by one and then the steps 120-126 are repeatedly achieved until the value of i exceeds the divisor P, thereby obtaining the encoded image 30 of FIG. 3 and the index record of FIG. 4 in the buffer memory 11A and the work memory 10, respectively.

In the case where the data code capacity per sector of the optical disk 3 is 100 bytes, namely, K=800 (bits) and the sector address indicated by the file pointer $P_a$ is "50", if the sizes of the respective encoded partial regions B(1)-B(4) are "1200", "4800", "2400", and "2400", the index record is provided with the partial region addresses A(1)-A(4) as shown in FIG. 4.

The encoded image data 30 stored in the buffer memory 11A is stored, in step 128, in a region including a plurality of sectors of the disk beginning from the address A(1) of the image file region 3A, whereas the index record 40 generated in the work memory 10 is recorded, in step 130, in a sector at an address position indicated by the index file pointer $P_a$ of the index file region 3B on the optical disk. In step 132, for a preparation of the registration processing of the next image data, the values of the image file pointer $P_a$ and the index file pointer $P_b$ are respectively updated to the values indicating the next recording start sector. In step 134, the program judges whether or not an end command has been received. If an end command has been inputted, control is returned to the step 106; otherwise, the step 108 is achieved to effect the input processing of the next image.

Next, a description will be given of a control operation applied to the case where the operator inputs a command specifying an image retrieval.

Figure 6:
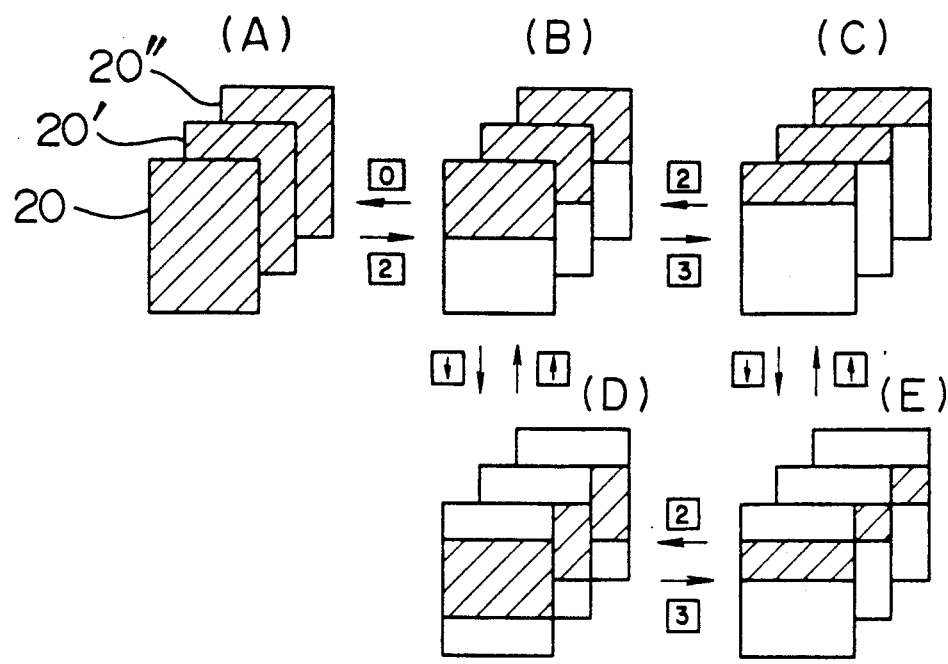
FIG. 6 is an explanatory diagram of a data retrieval function in the file system to which the present invention is applied shown by states (A)-(E)

FIG. 6 is a schematic diagram illustrating a retrieval function in the file system according to the present invention in which reference numerals 20, 20', and 20'' represent image data respectively retrieved. The shaded portions in FIG. 6 indicate the portions to be displayed on the screen. In FIG. 6, (A) stands for a state in which the entire screen is displayed, (B) represents a state in which the upper-half portion (the first and second partial regions) of the image is displayed, (C) is a state in which upper quarter portion (the first partial region) of the image is displayed, (D) expresses a state in which the second and third portions located in the central part of the image are displayed, (E) stands for a state in which the second partial region beginning from a position apart from the upper end of the image by ¼ of the vertical length thereof is displayed. Selection of any display state above can be arbitrarily specified from the keyboard 7 of FIG. 7; furthermore, a sequential display of images can also be arbitrarily specified in the forward or reverse direction.

Figure 7:
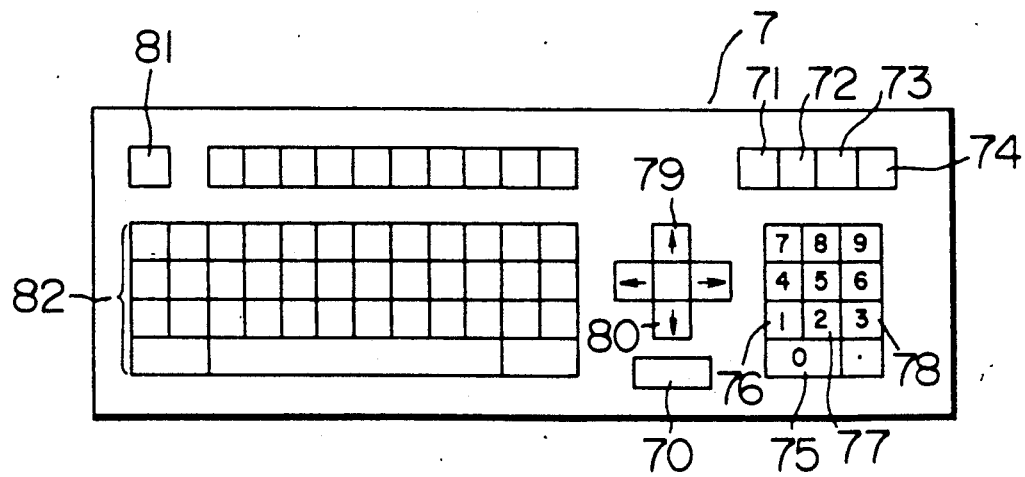
FIG. 7 is a schematic diagram illustrating an embodiment of a keyboard.

In FIG. 7, reference numeral 71 is a command input key for flipping the page of the image in the forward direction to display the next page, reference numeral 72 indicates a command input key for flipping the page of the image in the reverse direction to display the next page, reference numeral 73 denotes a command input key for successively flipping pages in the forward direction to sequentially display the image pages until a stop key 70 is pressed, and reference numeral 74 stands for a command input key for successively flipping pages in the reverse direction to sequentially display the pages. A change of the display size is accomplished by use of ten-key keys 75-78 corresponding to the digits indicated between (A) and (B) and between (B) and (C) of FIG. 6, whereas a change of the display position is achieved by use of cursor keys 79-80 associated with arrow marks shown between (B) and (C) and between (C) and (E) of FIG. 6. The size of an image to be displayed by means of a ten-key key with a number j is here assumed to be $$\left( i - \frac{j}{p} \right) \times \text{the entire size}$$

and the value of P is set to "4". Furthermore, the amount of a change of the display position to be changed by means of cursor keys 79-80 is to be equivalent to $$\frac{1}{P} \times \text{the entire original image}$$

for each operation. Incidentally, a set of keys 82 of the keyboard 7 of FIG. 7 are disposed to input character strings such as an index.

Figure 5A:
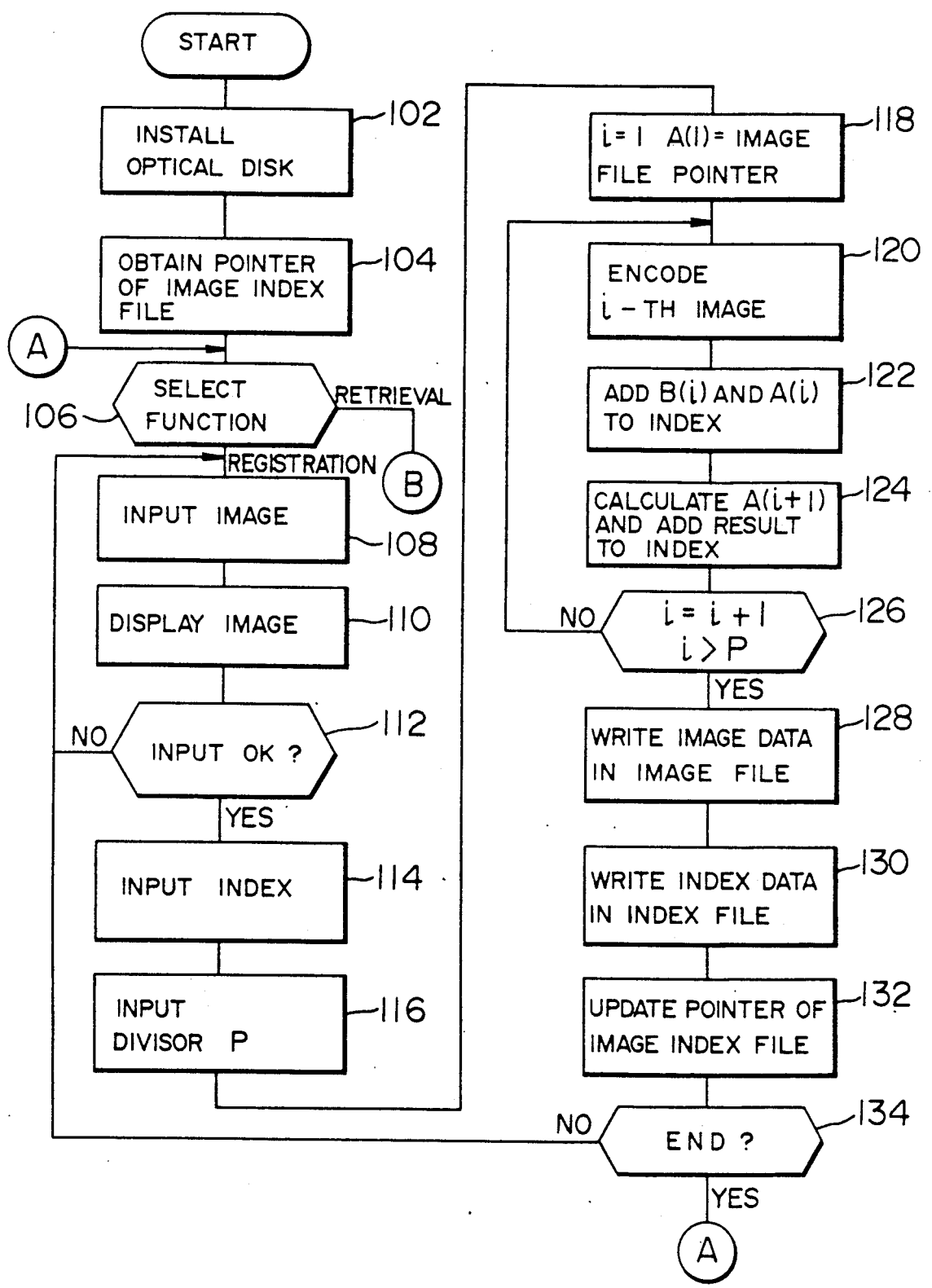
FIGS. 5A-5D are flowcharts showing an embodiment of a control program of the file system.
Figure 5B:
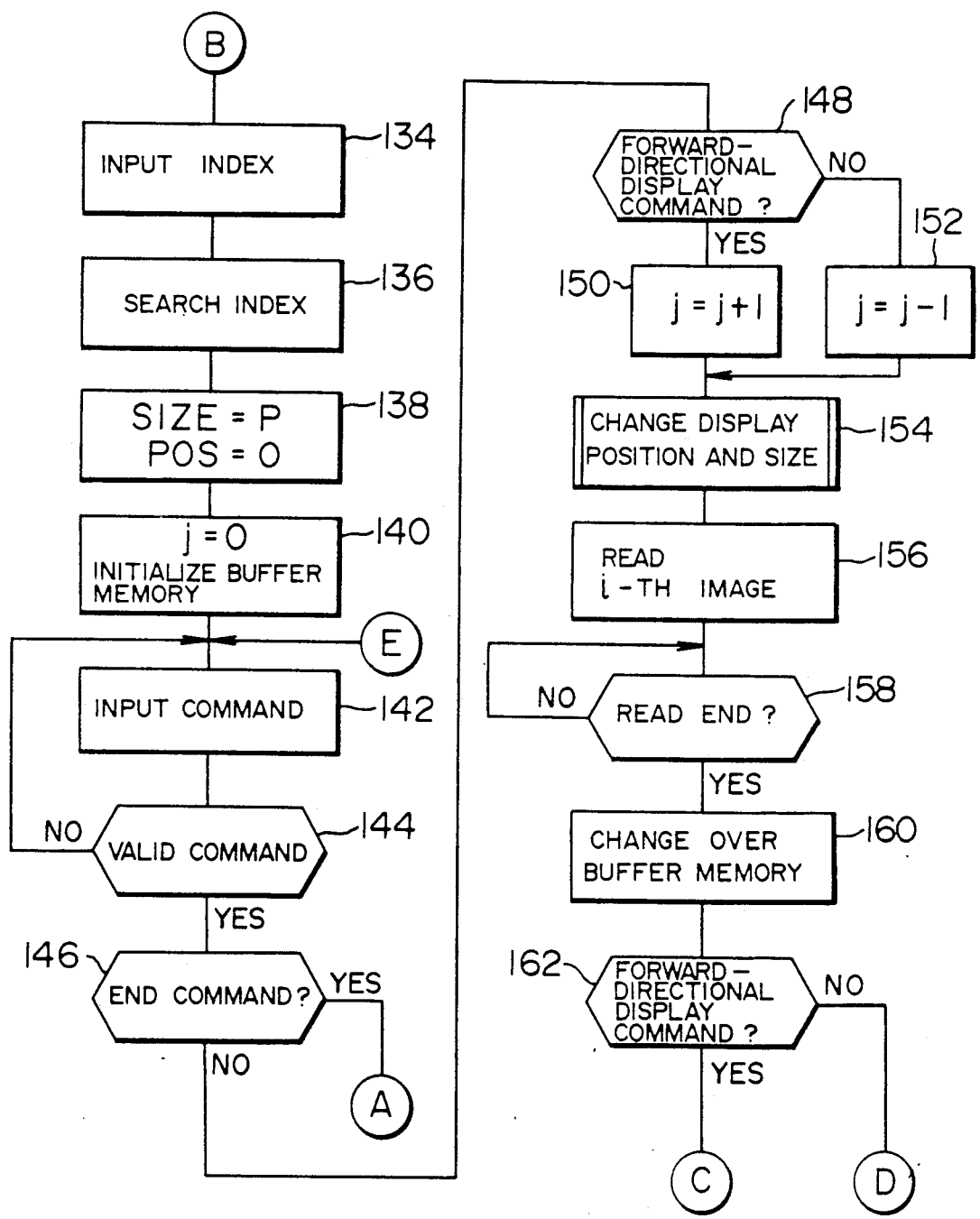
Figure 5C:
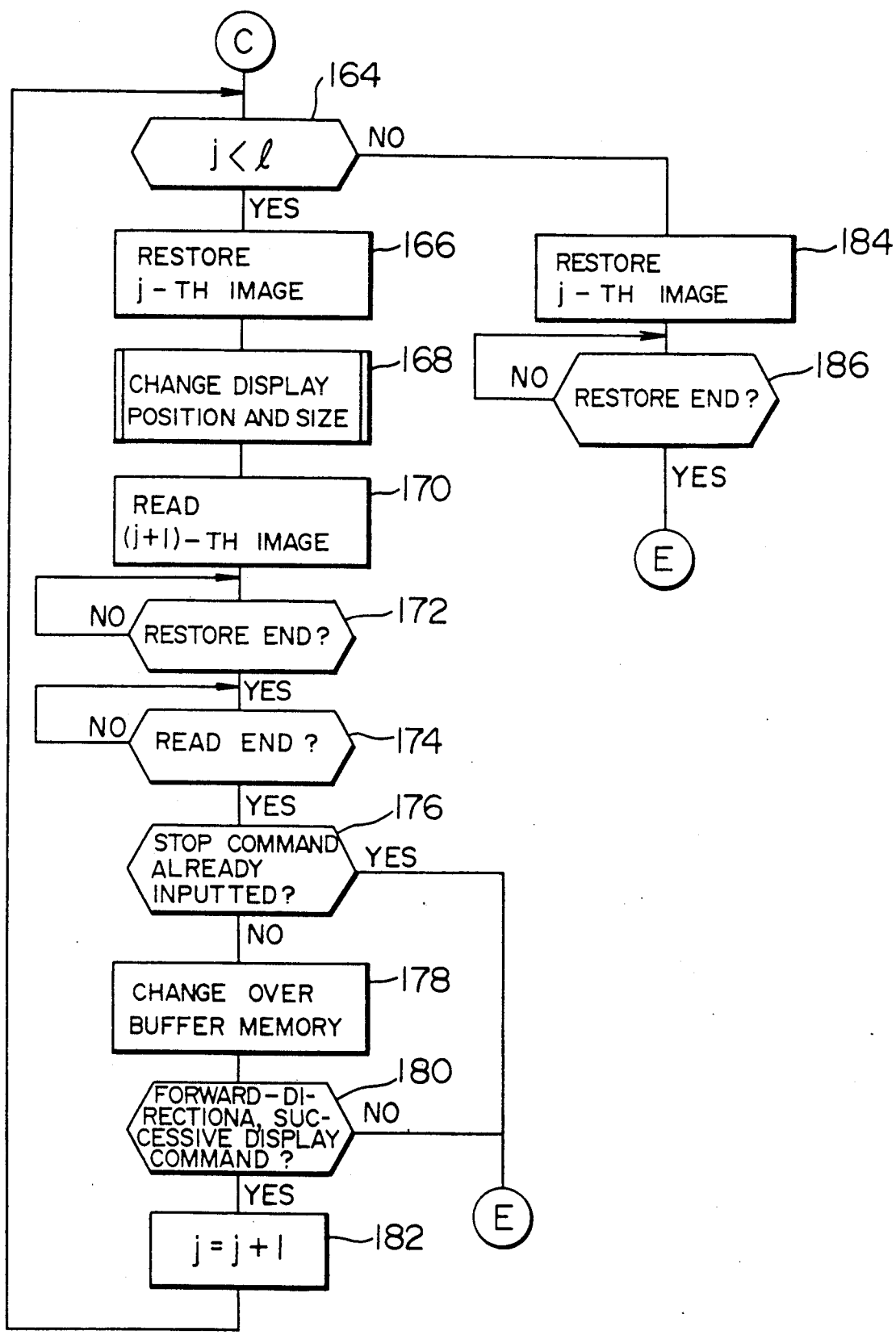
Figure 5D:
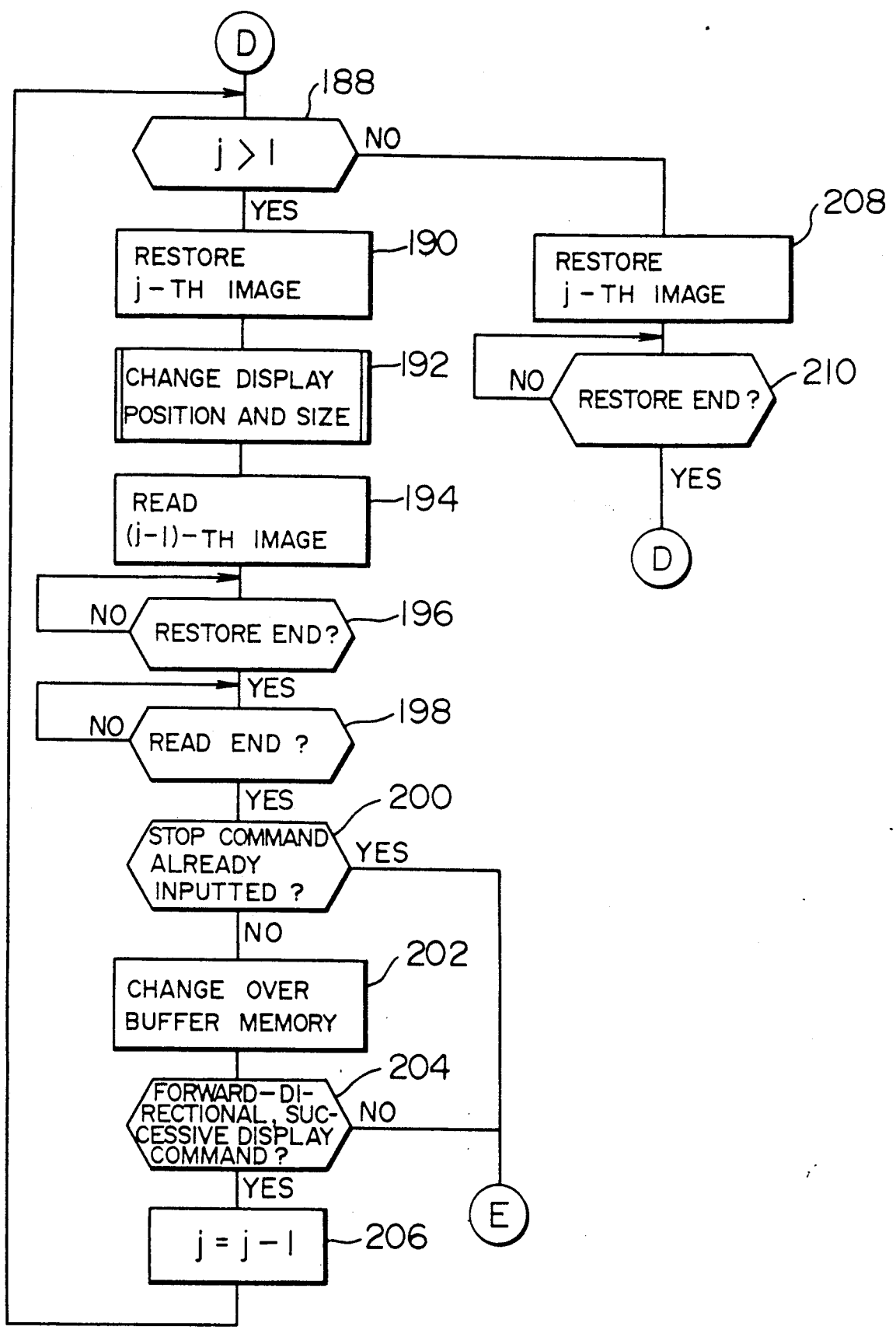

The retrieval function above is realized through control sequences of FIG. 5B-FIG. 5D to be executed when a retrieve command is inputted. First, in step 134, an index of objective image data, for example, "TOK- KYO (patent)" is inputted from the keyboard 7. The supplied index is stored in a predetermined area of the work memory 10, and then in step 136, the index file 3D is searched to retrieve a record associated with the index. This retrieval of the record is performed in a procedure such that the data is sequentially read from the index file 3B so as to be loaded in the work memory 10 where the character string of the index undergoes a matching operation. A set of retrieved index records are stored as a record table 80 of FIG. 8 in the work memory 10. Each record includes, like the constitution of FIG. 4, an index field 81 and address fields 82-$i$ and 83-$i$ and a size field 84-$i$ for each partial region. In this diagram, l indicates the data count of data searched by the index retrieval.

In the subsequent step 138, a variable "SIZE" indicating the size of the display image and a variable "POS" denoting the start position of the display partial region are initialized. Here, the variables "SIZE" and "POS" are to be specified by using 1/P of the overall image as the unit and the initial values of "SIZE" and "POS" are assumed to be "P" and "O", respectively, which namely corresponds to the state (A) of FIG. 6 displaying the entire image. In step 140, the image display specification parameter j for the next image to be displayed is initialized to "O" and 11A is specified for the buffer memory to store the next image read from the image file 3A. In step 142 waiting for a command input from the operator, when the command input is received, step 144 is effected to check for the validity of the inputted command. The program here recognizes the validity only for the forward-directional successive display command C1 associated with the key 73, the forward-directional one-page display command C2 corresponding to the key 71, the reverse-directional successive display command C3 for the key 74, the reverse-directional one-page display command C4 associated with the key 72, and an end command for the keys 75-78 changing the display size and the keys 79-81 changing the display position. Furthermore, the program regards as invalid, like an input of an undefined command, an input of a forward-directional display command in a state where the last image having the image number l is being displayed and an input of a reverse-directional display command in a state where the first image having the image number 1 is being displayed. In step 148, the display direction of the command is judged to be the forward direction (C1 or C2) or the reverse direction (C3 or C4) so as to proceed to step 150 or 152, and then the parameter number j specifying the next image to be read is determined.

In step 154, it is checked to determine whether or not a command to change the display size or position has already been inputted. If such a command has already been received, the variables SIZE and POS are changed.

Figure 9:
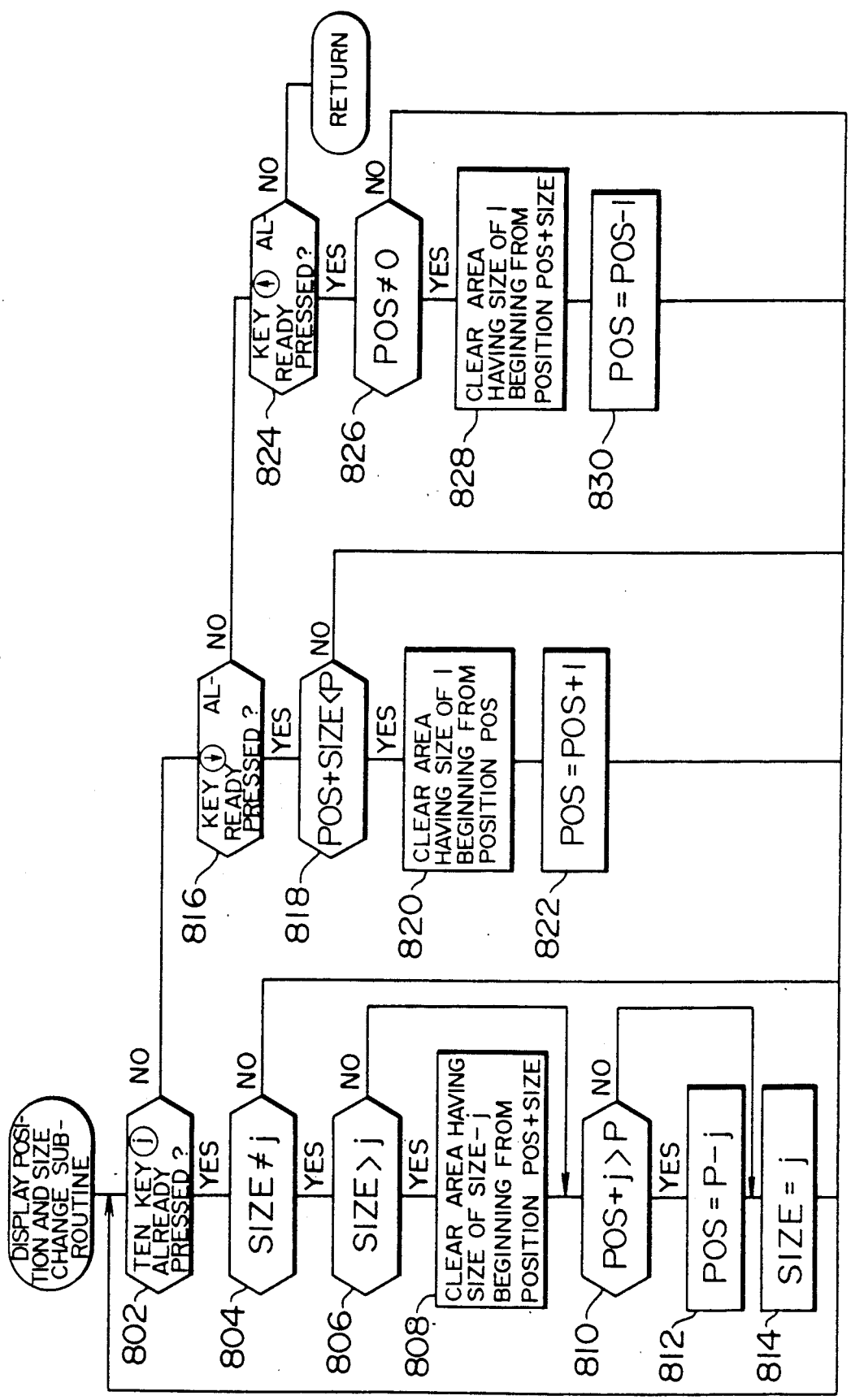
FIG. 9 is a flowchart showing an example of a program to change the display position and size of image data.

FIG. 9 is a detailed flowchart of a subroutine associated with the step 154. In step 802, the program judges whether or not keys 75-78 of the ten-key pad have been inputted, namely, whether or not a command changing the display size has been received. If the command has been inputted, a sequence of steps 804-814 is executed. In step 804, when it is confirmed that the specified new size is not equal to the current size, step 806 is accomplished to judge whether or not the new size is less than the present size. If this is the case, step 808 is achieved to clear on the bit map memory 13 a portion which is being displayed and which becomes not to be displayed thereafter. In step 810, it is judged whether or not the image exceeds the lower limit when the image is changed to the specified size at the current display position. If the lower limit is exceeded, the position POS is moved upward until the bottom end of the display 5 matches with the bottom end of the image. Finally, in step 814, the size variable SIZE is changed.

In the step 802, if the size change command has not been inputted yet, step 816 is executed to judge whether or not a command to move the display position downward has already been inputted. If the command has already been received, step 818 is achieved and when it is confirmed here that the current position is other than the bottom end, control is passed to step 820 to clear on the bit map memory 13 a portion which is being displayed and which becomes not to displayed after the display position is moved. Finally, in step 822, the value of the variable POS is incremented to move the display partial region downward.

If a downward move command has not been inputted yet, control proceeds to step 824 to judge whether or not an upward move command has already been received. If such a command has already been inputted, steps 826-830 are executed. In a sequence of the steps 826-830, the display position is moved upward according to the same idea applied to the sequence of the steps 816-822 above. Incidentally, in this subroutine, in order to receive in an arbitrary sequence a command to change the size of the display region and a command to change the position thereof, control returns to the first step 802 after the processing of a command is completed and then it is again judged whether or not the next command has already been received.

Returning now to FIG. 5B, in the next step 156, referring to a record having an image number j in the table of FIG. 8, subdivided image data is read from a region of the optical disk 3 ranging from the Aj′ (POS)-th sector to the Aj′ (POS+SIZE −1)-th sector, the number of sectors thus read corresponding to the value of "SIZE", and then the subdivided image data is stored in a predetermined buffer memory. Although whether or not the buffer memory 11A or 11B is assigned for the read operation is determined depending on the pertinent state as will be described later, in the initial state, the subdivided image data is stored in the buffer memory 11A established in step 140. In step 158, when it is confirmed that the read operation of the image data is completed, step 160 is accomplished to change over the buffer memory for the next image data from the buffer memory 11A to the buffer memory 11B (from 11B to 11A in the next change-over operation). Thereafter, if a command inputted in the step 142 is a forward-directional display command, the steps 164-186 of FIG. 5C are effected. If the command is a reverse-directional display command, the steps 188-210 of FIG. 5D are executed.

In a case of a forward-directional display command, the step 164 is achieved to compare j with l. If the latest image read out is not the final retrieval data having the image number l, steps 166-182 are executed. In the step 166, the decode processor 15 restores the compressed image data having the image number l stored in the buffer memory 11A or 11B and the restored data is stored in the bit map memory 13. The image data to be restored is assumed to range from the $a_j$(POS)-th bit to the bit of $B_j$(POS)+$B_j$(POS)+ . . . $B_j$(POS+SIZE−1). In step 168, the subroutine of FIG. 9 is executed again and then step 170 is achieved to read the (j+1)-th image into a buffer memory which is different from the buffer memory storing the j-th image. The restore processing of the step 166 and the read processing of the step 170 are concurrently accomplished by using the bus 17 in a time sharing fashion. In steps 172 and 174, it is confirmed that the restore processing and the read processing are completed; thereafter, step 176 is executed to confirm whether or not a stop command has been inputted by the operator. If this is the case, control returns to the command input wait state in the step 142; otherwise, step 178 is effected to achieve the change-over operation between the buffer memories 11A and 11B for the next image data to be read. In the next step 180, it is judged whether the received command is the forward-directional successive display command or the forward-directional one-page display command. For the former, step 182 is executed and then the sequence beginning from the step 164 is repeated. For the latter, control returns to the command input wait state in the step 142. In the case where the image read in the step 164 is judged to be the last data, since the next image data need not be read out, only the steps 184 and 186 corresponding to the steps 168 and 172 are executed and then control enters the command input wait state in the step 142.

The sequence of steps 188-210 to be achieved when a reverse-directional display command is inputted is the same as the sequence of steps 164-186 described above except that the image read sequence is reversed; consequently, details thereabout will not be described.

Incidentally, as can be seen from the description of operations above, since the registration and the retrieval are effected in the different modes, the memory 13 necessary only for the registration can be physically used for the memory 11A or 11B. Furthermore, in the embodiment above, although the registration and the retrieval are possible in the image file system, the image file medium can be removed from the system so as to be installed in another system. Consequently, a system only for the register processing and a system only with the retrieval function may be separately installed. Moreover, in the embodiment above, although the original image is subdivided by the divisor P into partial regions of the same size, the partial regions may be of the predetermined different sizes or the subdividing positions may be varied depending on the size of the original image. In addition, as information indicating the state of subdivision, information of the size and position of each partial region is stored in the index file in the embodiment; however, it may also be possible to store either size information or position information and to calculate information not stored when an image is retrieved. Furthermore, in the embodiment above, although an index record is generated for each image, the index record may be prepared for each partial region.

Next, a description will be given of a second embodiment according to the present invention. In the second embodiment, the image data record is not beforehand subdivided and is directly recorded in the image file 3A and when a retrieval image is read from the image file, an image data store location (region) substantially associated with a partial region specified by the operator is calculated so as to selectively read out a portion of the image data, thereby displaying the image data portion on the display 5.

Figure 10:
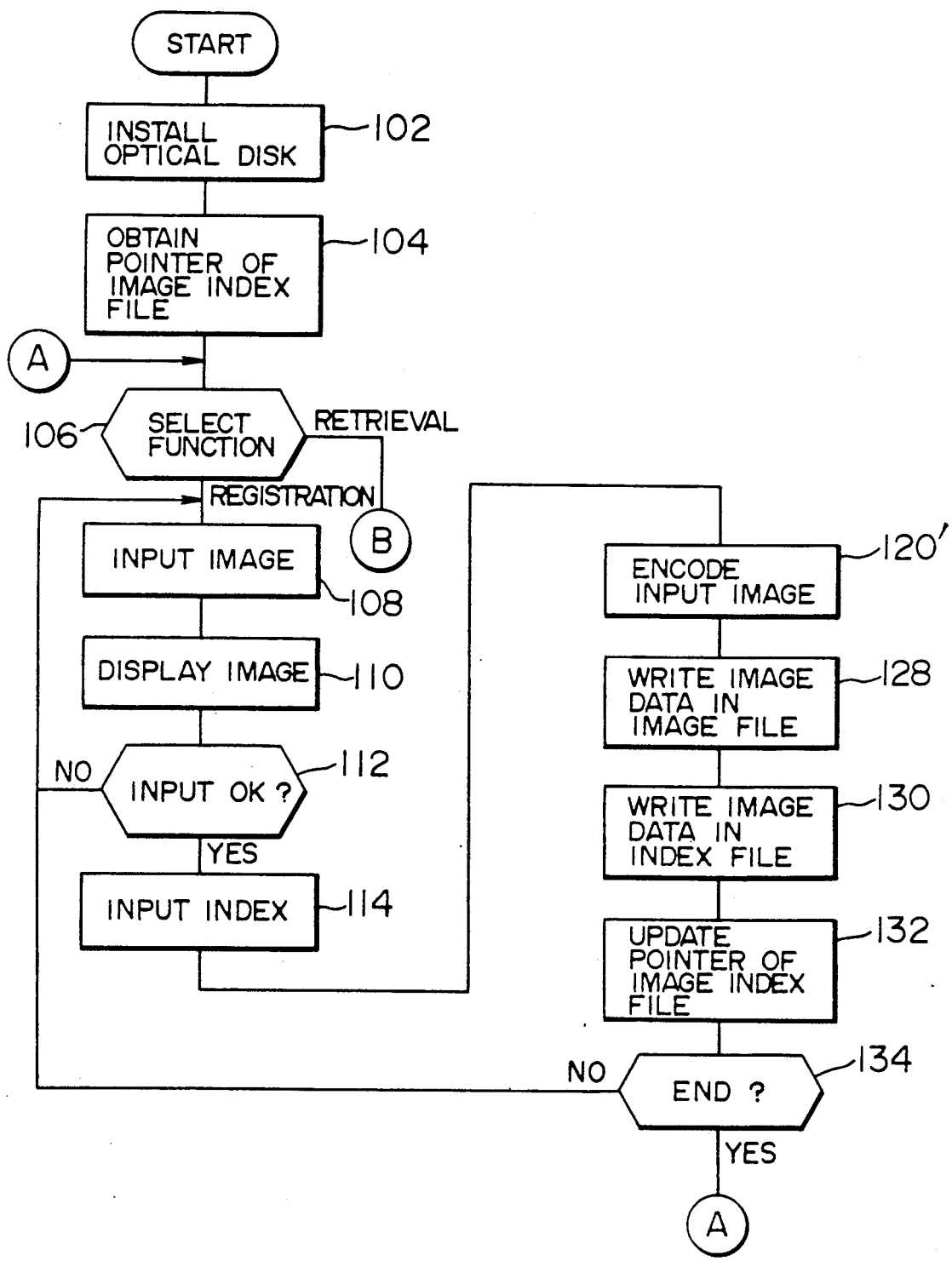
FIG. 10 is a flowchart of a program to register image data in a second embodiment.
Figure 11:
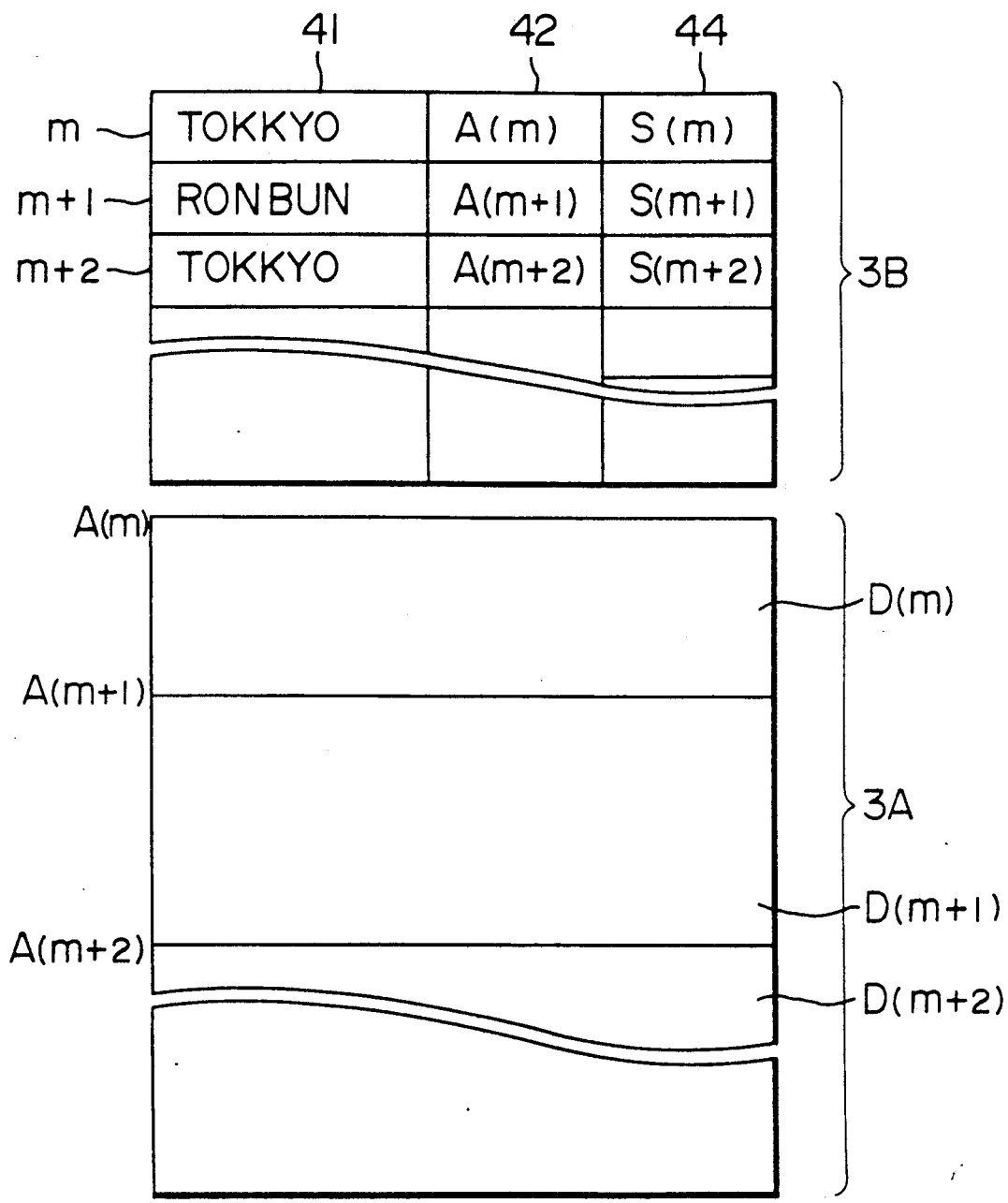
FIG. 11 is an explanatory diagram useful to explain relationships between the record format of an index file and an image data file in the second embodiment.

That is, in the case where image data is registered to the image file 3A, as shown in FIG. 10, when an index is inputted in step 114, the entire input image is encoded (compressed) and then the resultant image is written in the image file region 3A of the optical disk 3 in step 128. Furthermore, in step 130, an index record is written in the index file region 3B. The index record in this case includes, as shown in FIG. 11, an index field 41, a field 42 for storing a sector number in the image file 3A indicating a store address of a compressed image data record associated with the index, and a field 44 for storing a byte count indicating the length of the compressed image data. In this diagram, image data D(m), D(m+1), and D(m+2) corresponding to index records m, m+1, and m+2 are stored in recording areas beginning from sector address A(m), A(m+1), and A(m+2), respectively of the image file region 3A and are of lengths S(m), S(m+1), and S(m+2), respectively.

The file search operation on a file storing indices and image data in the format above is also effected according to the control procedure shown in FIGS. 5B-5D. That is, a set of index records retrieved by the index search (step 136) of FIG. 5B are recorded on the work memory 10 as a record table 80' of FIG. 12. Each record includes an index field 81, an address field 82 of the image data, and a field 83 indicating the length of the image data.

The size variable SIZE of a partial image to be displayed and the variable POS of an extract position of the partial image are specified in the similar fashion to that applied to the first embodiment. In step 156, the identification of the image data read region is achieved as follows, for example. Namely, in the case where an image D(mj) corresponding to the j-th record is read from the record table 80', the first sector of the image data read region and the last sector thereof are attained from expressions (1) - (2), respectively as follows.

$$A(mj) + [S(mj) \cdot (POS/P)/K] - \alpha \quad (1)$$

$$A(mj) + [S(mj) \cdot \{(POS + SIZE)/P\}/K] + \beta \quad (2)$$

where, K is the number of data bytes per sector, $\alpha$ and $\beta$ indicate a predetermined positive constant or zero, and the symbol [x] is the Gaussian symbol meaning that an integer is attained by truncating the value of x. Determination of the image data read region through the calculations above is based on an idea that the content of each partial region attained by subdividing the original image by the divisor P, the partial region being of the same size, can be substantially read out by providing margins $\alpha$ and $\beta$ for the partial regions thus obtained.

Figures 12, 13:
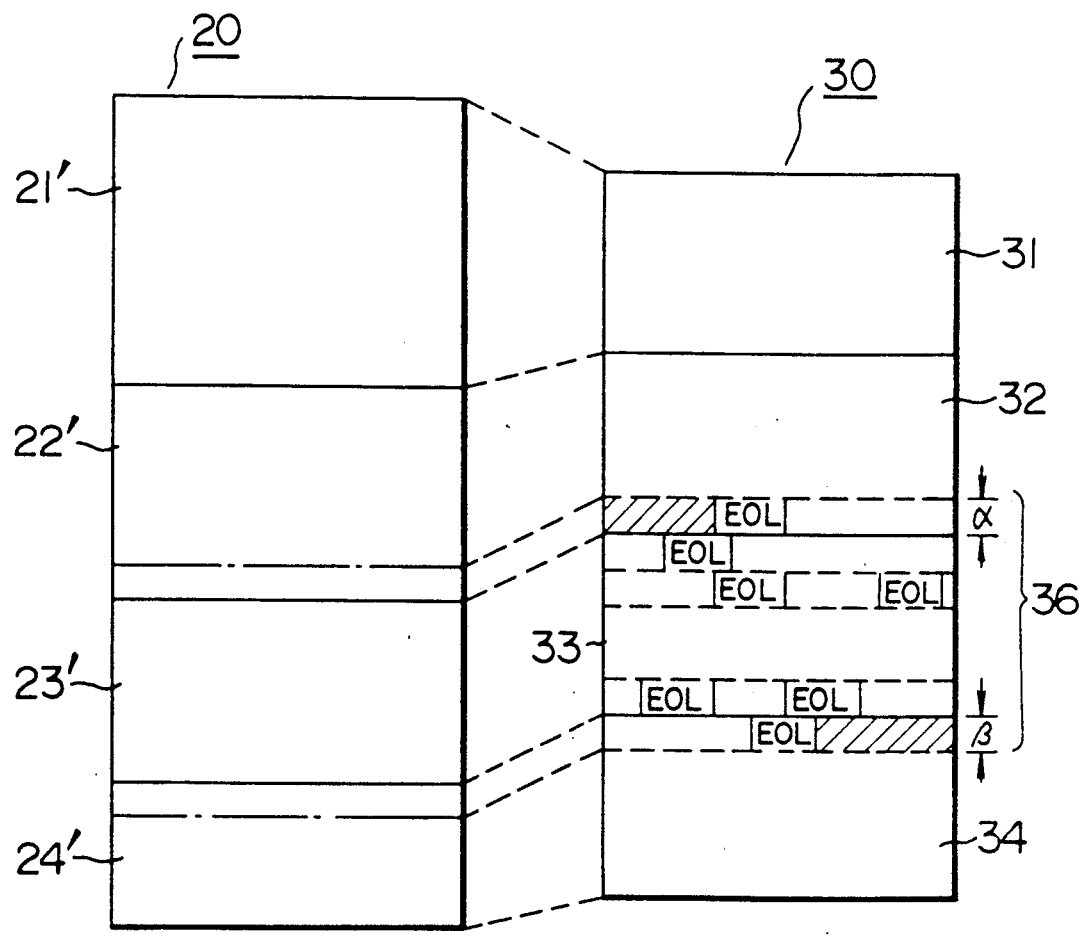
FIG. 12 is a schematic diagram showing a retrieval record table in the second embodiment.
FIG. 13 is an explanatory diagram useful to explain relationships between a read range of image data and a restored image in the second embodiment.

FIG. 13 is a schematic diagram illustrating corresponding relationships between the partial regions of the compressed image data 30 recorded in the image file region 3A and the partial regions of the image 20 attained by restoring the partial regions of the compressed image data 30. In this example, the compressed image 30 is equally subdivided into P (=4) partial regions 31-34. In this case, marginal sectors $\alpha$ and $\beta$ are additionally assigned for the third partial region 33 to establish a read region 36. In the case where the compressed image 30 is compressed through such an encoding operation as that of the Modified Huffman encode method described in the paper above in which the separation between lines of the original image is retained, the last position of each line is located in the compressed image as indicated by a code "EOL". The EOL code comprises a particular bit pattern, for example, including at least a predetermined number of "0's" followed by a "1" bit and can be extracted through a string matching operation from an arbitrary code string read from the file. When the compressed image includes an EOL code, data (shaded portion) preceding the first EOL in the marginal region α and data succeeding the last EOL in the marginal region β each may possibly be separated at an intermediate point of a line or a code in the restored image. Consequently, these data are to be removed before the image is restored by the decode processor 15 in the step 166 of FIG. 5C, in other words, the data portion ranging from the first EOL code to the last EOL code in the read region 36 is subjected to the restore processing so as to be displayed on the display 5.

In the embodiment above, when a plurality of images are displayed by flipping image pages, the time interval to change the page is determined according to the size of the partial region of the image to be displayed. However, the time interval may also be set to be adjustable through a key operation, for example, like the case of the operations of acceleration and braking of a car.

Figure 14:
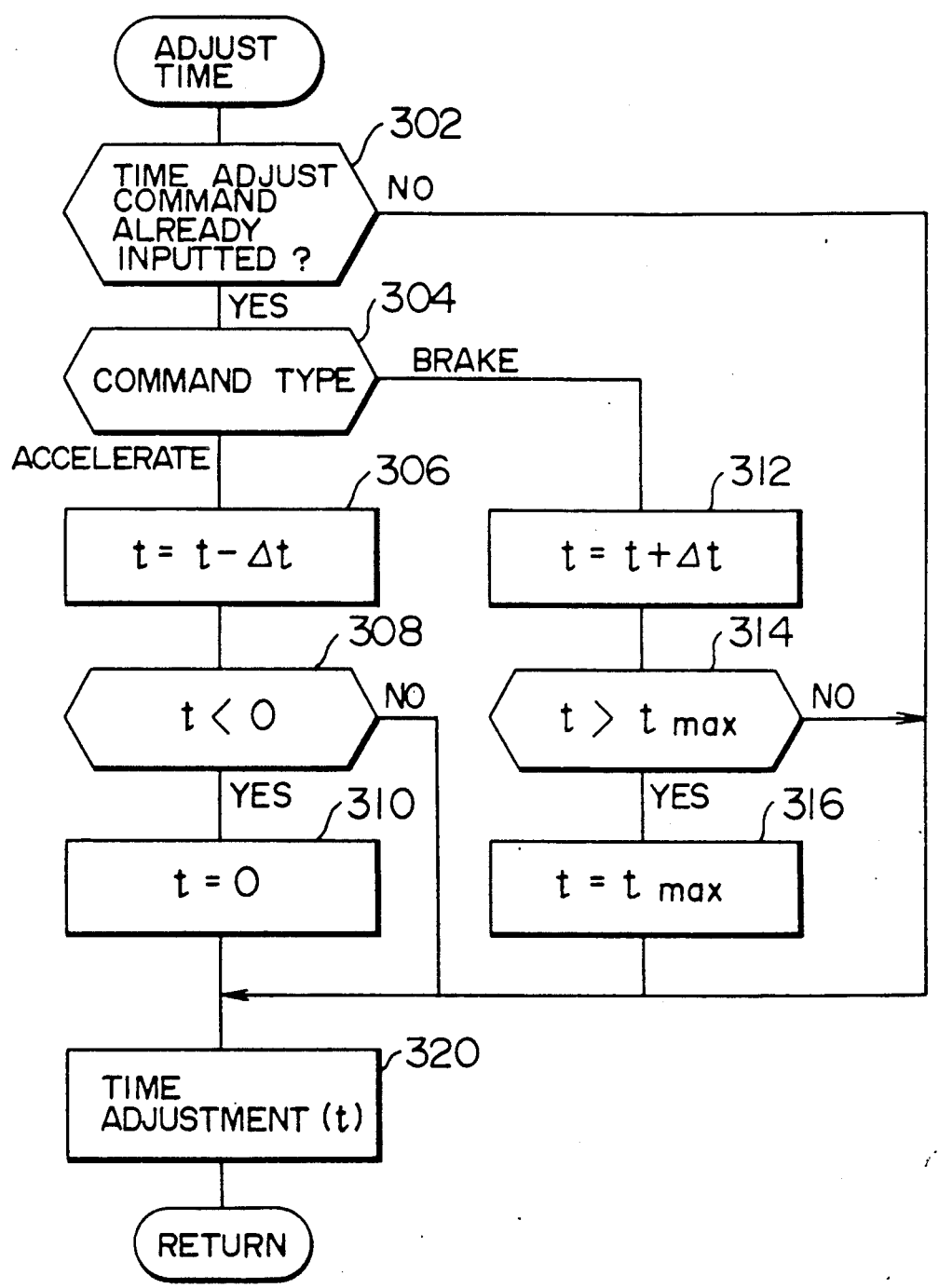
FIG. 14 is a flowchart illustrating an example of a routine to adjust a time interval for displaying image data.

FIG. 14 is an example of a flowchart to control a routine implementing the adjustment of the time interval. The first step 302 judges whether or not a time adjust command has been inputted from the keyboard 7 to indicate the operation of the acceleration or braking.

If the time adjust command has already been received, the program (step 304) judges whether the type of the input command is "accelerate" or "brake". For an "accelerate" indication of the input command, step 306 is executed to reduce the value of the wait time parameter t (to be described later) by a preset time value Δt. In the case where the value of t becomes to be negative as a result of the subtraction, a correction is effected to obtain t=0 (steps 308-310). If the type of the input command is "brake", the value of t is increased by a predetermined value Δt in step 312. In this case, the value of t is limited to the maximum value $t_{max}$ (step 314-315). Step 320 is a time adjust processing step to achieve the loop processing a number of times corresponding to the wait time parameter t.

The time adjusting routine is inserted, for example, immediately before the buffer memory changeover steps 160, 178, and 202 in the flowcharts of FIGS. 5B, 5C, and 5D, respectively. The initial value of the parameter t here need only be set as t=0 in the step 138. In the flowchart of FIG. 14, although the time interval in changed by the time of ±Δt each time the image is changed on the display 5, in order to increase the magnitude of the change, the value of Δt need only be set in proportion to the depression time of the accelerating or braking pedal.

In the first and second embodiments above, a position of a partial region of the image to be displayed on the display 5 is specified to identify the compressed image data portion to be read from the image file. As an alternative method (a third embodiment), for example, in response to a specification inputted by the operator to indicate a time interval or a display cycle for the image change through the successive page flipping operation, the compressed data may be read from the image file 3 beginning from a reference point, for example, the first data of each image record, the amount of the data to be read being associated with the specified time interval or the display cycle. The time interval may be specified, for example, with reference to an interval of time required to display the entire screen image through the ten-key pad, namely, "9" (=90%), "8"=(80%), etc.

Furthermore, in the cases of the first and second embodiments, since the amount of information included in a partial region to be displayed in the screen varies among the image pages, if compressed image data constituting a partial region of a specified size of a page is read out and the operation to read the compressed image data of the next page is initiated immediately thereafter, the display time in the display screen varies between the image pages. To minimize the variation in the display time of the pages, a standard value of the display time interval need only be established such that for a display cycle associated with a data amount less than that of the standard display time interval, the time interval adjusting routine is executed to delay the operation to read the next retrieval image. Although the standard display time interval may be specified by the operator, it may also be possible that in the step 136 and/or the steps 154, 168, and 192 of the flowcharts of FIGS. 5B-5D, the contents of the table 80 are searched to find an image having the maximum amount of data with respect to the size of the partial region to be displayed, thereby setting the standard display time interval to be equal to the interval of time necessary for displaying the image. In this case, it is only necessary to effect a time adjustment corresponding to the difference between the maximum amount and the amount of data of the partial region to be subsequently display immediately before the steps 160, 178, and 202 in the similar fashion to that applied to the routine of FIG. 14. If an effect due to a size change of a partial region during a retrieval processing need not be considered, the image having the maximum data amount may be detected only through the step 136.

In the embodiments above, since an image is displayed for an image, the display position on the display 5 is basically invariant even when the position and size of the partial image specified to be displayed are changed. However, the display positions of the respective images may be changed so as to display a plurality of images for an image. FIG. 15 is a schematic diagram of display contents on the display 5 in the case where two partial image data obtained in the state (A) or (B) of FIG. 6 are displayed for each image. The digit enclosed by a circle indicates an image number. In this example, the digits alternately indicate the pertinent partial region of the next image in the upper and lower half of the image. FIG. 16 shows display contents on the display 5 in the case where four partial image data obtained in the state (C) or (E) of FIG. 6 are displayed for each image. In this case, the pertinent partial image of the next image is cyclically displayed in a display region obtained by equally subdividing the image by four. The display format can be easily implemented by sequentially changing the address of the bit memory map 16 storing the restored image in the steps 166, 184, 190, and 208 of the flowcharts of FIGS. 5B-5D.

As can be seen from the description above, according to the present invention, since a part of image data encoded and then stored in a file is selectively read therefrom so as to be decoded to obtain a display image, when a plurality of retrieved images are sequentially displayed, the period of time required to display all images can be minimized. As a result, when the operator knows the substantial position of a characteristic part of an objective image to be displayed, the objective image can be selected at a high speed from a plurality of images.

While the invention has been described with reference to the particular illustrative embodiments, it is not restricted by those embodiments but only by the appended claims. It is to be appreciated that those skilled in the art can change and modify the embodiments without departing from the scope and spirit of the invention.

What is claimed is:

1. A display method for displaying on a display screen at least one image retrieved by an image processing system having a first memory means which stores a plurality of image data records each having a shortened data form obtained by compressing an original image data derived from an original image by data encoding and a second memory means which stores a plurality of secondary records corresponding to said image data records, each of said secondary records including index information and positional information for one of said image data records, said method comprising:

a first step of specifying, by an operator, first index information for retrieving a first set of image data records and a partial region of a retrieved image to be displayed on the display screen;

a second step of retrieving a first set of secondary records from said second memory means based on said specified first index information;

a third step of selectively reading from a one of said image data records among the first set of image data records in said first memory means corresponding to said retrieved set of secondary records, based on the positional information included in a one of said retrieved first set of secondary records, a particular image data block corresponding to the partial region specified by the operator; and, a fourth step of converting the image data block thus read to a partial data having an original image data form by data decoding thereby to display a partial region of the original image on the display screen.

2. A display method for displaying a partial region of an original image retrieved by an image processing system having a first memory means which stores a plurality of image data records each having a shortened data form obtained by compressing an original image data by data encoding and a second memory means which stores a plurality of secondary records corresponding to said image data records, each of said secondary records including index information and positional information for a one of said plurality of image data records, said method comprising:

a first step of specifying, by an operator: i) first index information for retrieving first image data records; and, ii) a partial region of a retrieved image to be displayed on a display screen;

a second step of retrieving a first set of secondary records from said second memory means based on said specified first index information;

a third step of selectively reading, from a one of said image data records in said first memory means corresponding to said retrieved secondary records, based on the positional information included in one of said retrieve secondary records a particular image data block corresponding to the partial region specified by the operator; and, a fourth step of converting the image data block thus read to a partial original image data having an original image data form by data decoding, to display the partial region of the original image on the display screen, wherein said third step and said fourth step are repeatedly effected to thereby exchange the displayed image data block successively.

3. The display method according to claim 2 wherein said image processing system is further provided with at least two buffer memory means, and wherein said third step and fourth step are effected simultaneously so that after a particular image data block read from an image data record is completely loaded in one of the buffer memory means, another particular image data block is read from the next one of said image data records based on the positional information included in another one of said retrieved secondary records so as to be loaded in an other one of the buffer memory means in concurrence with a conversion processing of the image data block previously read out from said first memory means to said buffer memory means.

4. The display method according to claim 2 further comprising:

a fifth step of adjusting an output timing of the partial region of the original image to the display screen depending on an amount of data of the image data block read out from each of the image data records, thereby to unify a display period of each partial original image region on the display screen.

5. The display method according to claim 2 further comprising:

a step of designating by the operator a time interval for exchanging the partial image region on the display screen; and a step of controlling a start point of time of at least one of said third step and said fourth step in accordance with said designated time interval.

6. The display method according to claim 2 wherein said first memory means stores each of said image data records in a form of a plurality of subdivided data regions encoded individually and said second memory means stores said secondary records, each of which includes position data for indicating boundaries of said subdivided data regions of a image data record corresponding thereto as a part of said positional information, and wherein:

said first step further comprises a step of specifying said first index information and a step of specifying said partial region of a retrieved image in a unit of said subdivided region; and, said third step further comprises a step of finding positional data for indicating the boundaries of said particular image data block corresponding to said specified partial region among said position data included in said secondary record, thereby to selectively read said particular image data block on the basis of said position data thus found.

7. The display method according to claim 2 wherein the third step comprises:

a step of equally subdividing, based on the positional information contained in said secondary record, an image data record corresponding to said secondary record into a plurality of partial regions;

a step of selecting at least one of said subdivided partial regions having a positional relationship corresponding to said partial region specified by the operator to obtain positional information of said selected at least one subdivided region; and, a step of reading said particular original image data block from said first memory means based on said positional information of said selected subdivided region.

8. The display method according to claim 7 further comprising reading said particular image data block from said first memory means on an enlarged data region by providing said selected subdivided region with extra areas extending into adjacent subdivided regions.

9. A display method for displaying at least one image in an image file system which has file means for storing a plurality of image data records having undergone a data compression by data encoding original image data to shorten their data length, a memory means for storing a plurality of secondary records each including index information and positional information for a one of said image data records, and a temporary storage for temporarily storing retrieved secondary records, said method comprising:

a first step of specifying, by a user: i) index information for retrieving image data records and ii) a display cycle of a retrieved image on a display screen;

a second step of retrieving secondary records from said memory means according to said specified index information and storing said retrieved secondary records in said temporary storage;

a third step of selectively reading an amount of compressed image data for a partial image from said image data records by successively accessing said file means in accordance with the positional information included in each of the secondary records retrieved in the second step, said amount of compressed image data being determined according to the specified cycle;

a fourth step of successively converting the compressed image data read out in the third step into a partial original image data having an original image data form by data decoding to display a succession of partial images one by one each reproduced from said converted partial original image data on the display screen in turn;

a step of inputting, by said user, a command for holding fixed a displayed image on the display screen; and, repeating the third and fourth steps automatically for a plurality of the compressed image data until the command to hold the displayed image is inputted by the user.

10. The display method according to claim 9 further comprising: after the compressed image data for the partial image read out from an image data record in said file means is completely loaded in a first buffer memory, reading out compressed image data for another partial image from a next image data record in said third step so as to be loaded in a second buffer memory in accordance with a conversion processing in said fourth step for processing the compressed image data previously read out.

11. A display method for successively displaying a plurality of retrieved image data on a display screen, in an image file system having a first file means for storing a plurality of compressed image data records each including one page of shortened image data compressed by encoding an original image data, and a second file means for storing a plurality of index data records each including index information of a one of said image data records and positional information to selectively access said one image data record, the method comprising:

a first step of designating by a user a retrieval condition to specify compressed image data records to be retrieved and a display region in one page of an image to be displayed on the display screen;

a second step of sequentially reading out respective whole image data of retrieved compressed image data records one after another from the first file means when the user has designated a full size of the page as said display region based on the positional information in index records retrieved from said second file means according to said retrieval condition designated by the user;

a third step of selectively reading out a partial data block of respective retrieved compressed image data records one after another from the first file means when the user has designated a partial area of the page as said display region based on the positional information in index records retrieved from said second file means according to said retrieval condition designated by the user; and, a fourth step of successively converting the respective compressed image data read out in a one of the second step and third step to an image data having an original image data form to display a part no more than a whole of an original image on the display screen one after another.

12. The display method according to claim 11 wherein said third and fourth steps are effected in parallel so that after one partial data block of compressed image data read out from a retrieved image data is completely loaded in a first buffer memory, another partial data block of compressed image data is read out from a logically adjacent retrieved image data record in said third step so as to be loaded in a second buffer memory in occurrence with the conversion processing in the fourth step of the compressed image data block previously loaded in said first buffer memory means.

13. A display system for successively displaying a plurality of pages of retrieved images on a display screen, comprising:

a first file means for storing a plurality of image data records, each including one page of compressed image data compressed by data encoding of original image data;

a second file means for storing a plurality of code data for retrieving ones of said image data records and a plurality of position data each related to one of said code data so as to selectively access a one of said plurality of image data records specified by said one code data;

means for designating by a user a display region in one page of an image to be displayed on the display screen and a retrieval condition for retrieving image data records;

means for sequentially selectively reading out whole image data blocks of respective retrieved image data records from the first file means according to the positional data related to retrieved code data which match with said retrieval condition if the user has designated a full size as said display region, and for sequentially selectively reading out partial image data blocks of respective retrieved image data records from the first file according to said positional data related to said retrieved code data if the user has designated a partial area of the page as said display region; and, converting means for successively converting by data decoding the image data blocks read out from said first file means to image data having a form of the original image data to display a part or whole of original images on the display screen one after another.

14. The display system according to claim 13 wherein said reading means comprises at least two buffer memory means and switching means for switching said buffer memory means in such a manner that, after an image data block read out from said first file means is completely loaded in one of the buffer memory means, a next image data block read out from said first file means is loaded in the other one of the buffer memory means in synchronism with the conversion process in said converting means for the image data block previously loaded in said one of the buffer memory means.

* * * * *